United States Patent
Marconato et al.

(10) Patent No.: US 10,767,583 B2
(45) Date of Patent: Sep. 8, 2020

(54) METHOD FOR PROCESSING OF MOTOR POSITION DATA BY A MULTI-CORE COMPUTER

(71) Applicants: CONTINENTAL AUTOMOTIVE FRANCE, Toulouse (FR); CONTINENTAL AUTOMOTIVE GMBH, Hannover (DE)

(72) Inventors: Benjamin Marconato, Villeneuve Tolosane (FR); Arnaud Chicher, Toulouse (FR); Christophe Mazenc, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/342,571

(22) PCT Filed: Oct. 17, 2017

(86) PCT No.: PCT/FR2017/052855
§ 371 (c)(1),
(2) Date: Apr. 17, 2019

(87) PCT Pub. No.: WO2018/073532
PCT Pub. Date: Apr. 26, 2018

(65) Prior Publication Data
US 2020/0056556 A1   Feb. 20, 2020

(30) Foreign Application Priority Data
Oct. 21, 2016 (FR) ..................... 16 60236

(51) Int. Cl.
*F02D 41/26* (2006.01)
*F02D 41/00* (2006.01)
*G05B 19/042* (2006.01)

(52) U.S. Cl.
CPC ......... *F02D 41/009* (2013.01); *F02D 41/263* (2013.01); *G05B 19/0421* (2013.01); *F02D 2250/06* (2013.01); *G05B 2219/2623* (2013.01)

(58) Field of Classification Search
CPC .... F02D 41/009; F02D 41/263; F02D 41/266; F02D 2250/06; G05B 19/0421; G05B 19/0428; G05B 2219/2623; F02P 11/02
(Continued)

(56) References Cited

U.S. PATENT DOCUMENTS

| | | |
|---|---|---|
| 5,622,153 A | 4/1997 | Ott et al. |
| 6,644,273 B1 | 11/2003 | Hagari et al. |

(Continued)

FOREIGN PATENT DOCUMENTS

| | | |
|---|---|---|
| DE | 44 34 833 | 4/1996 |
| DE | 102 06 182 | 9/2003 |
| JP | 2013-130104 | 7/2013 |

OTHER PUBLICATIONS

International Search Report, PCT/FR2017/052855, dated Jan. 25, 2018.

(Continued)

*Primary Examiner* — Hai H Huynh
(74) *Attorney, Agent, or Firm* — Nixon & Vanderhye (57) ABSTRACT

Disclosed is a method for processing position data of an automotive vehicle motor, implemented by a multi-core electronic computer including: a software module for the production of data of angular position of the motor, and at least one software module for driving the motor as a function of the angular position data. The method includes a step of (Continued)

deactivation of each drive module by the module for the production of angular position data, followed by a step of activation of each drive module by the production module. In the course of the deactivation step, the production module dispatches to each drive module a deactivation command, and then a request for confirmation that each drive module is deactivated, and the step of activation of the drive modules is implemented only when the deactivation of all the drive modules has been confirmed to the production module.

20 Claims, 9 Drawing Sheets

(58) Field of Classification Search
USPC ............................... 701/102–107; 73/114.26
See application file for complete search history.

(56) References Cited

U.S. PATENT DOCUMENTS

| | | | | |
|---|---|---|---|---|
| 2013/0073182 | A1* | 3/2013 | Lindsay | F02D 13/0207 |
| | | | | 701/103 |
| 2015/0354479 | A1* | 12/2015 | Lindsay | F02D 41/266 |
| | | | | 123/480 |
| 2017/0307476 | A1* | 10/2017 | Leroy | G01D 5/14 |
| 2018/0128596 | A1* | 5/2018 | Mies | G01B 11/005 |
| 2018/0321105 | A1* | 11/2018 | Barta | F02D 19/0623 |
| 2019/0040805 | A1* | 2/2019 | Barta | G01M 15/08 |
| 2019/0041420 | A1* | 2/2019 | Zhong | G01P 3/38 |

OTHER PUBLICATIONS

Geoff Emerson et al: "AN3769, Using the Engine Position (CRANK and CAM) eTPU Functions", Sep. 28, 2012 (Sep. 28, 2012), XP055392335, Retrieved from the Internet URL:http://cache.nxp.com/docs/en/application-note/AN3769.pdf?fsrch=1&sr=2&pageNum=1 [retrieved on Jul. 19, 2017] paragraphes 2,3.5.3, 4.1 et 4.4.

Patrick Leteinturier et al: "Multi Core Benefits & Challenges for Automotive Applications". SAE Technical Paper Series, Apr. 17, 2008 (Apr. 17, 2008). pp. 776-4841. XP055164401, 2008 World Congress Detroit. Michigan D0I: 10.4271/2008-01-0989 the whole document.

Jorn Schneider et al: "Migration of Automotive Real-Time Software to Multicore Systems: First Steps towards an Automated Solution". Euromicro Conference on Real-Time Systems. Jul. 1, 2010 (Jul. 1, 2010), XP055393157, Brussels. Belgium the whole document.

Autosar: "Layere Softare Architecture Release 4.0", Jan. 17, 2012 (Jan. 17, 2012), XP055392936, Retrieved from the Internet: URL:https://automotivetechis.files.wordpre, ss.com/2012/05/autosar_exp layeredsoftware_architecture.pdf [retrieved on Jul. 21, 2017] the whole document.

* cited by examiner

Fig 1

——— Value of angular counter
– – – Reference position TDC_0
········ Motor angular position

METHOD FOR PROCESSING OF MOTOR POSITION DATA BY A MULTI-CORE COMPUTER

The invention relates to a method for processing position data of an automotive vehicle motor implemented by a multi-core electronic computer.

The invention applies in particular to the management of a loss of synchronization of the electronic computer with respect to the position of the motor, or to the management of motor operating modes for which motor drive commands must be interrupted, such as operation of the motor in reverse rotation or a resumption of the motor after a temporary interruption intended to save fuel ("Stop and Start" interruption).

An automotive vehicle electronic computer is conventionally a microcontroller comprising at least one software module for driving the motor of the automotive vehicle, adapted for example to drive fuel injection, ignition of the fuel, etc.

The commands carried out by the motor drive modules must be synchronized with the angular position of the motor so as to allow proper operation of the latter.

To carry out the synchronization of the driving of the motor with the angular position of the latter, the electronic computer also comprises a software module for the production of data of angular position of the motor, and an angular counter controlled by the data production module. The angular counter is a fixed counter of fixed angular resolution, so that each tick counted by the counter corresponds to a fixed angle value of the crankshaft of the motor.

The software module for the production of data of angular position of the motor is furthermore adapted to receive, from dedicated sensors, information relating to the position of the crankshaft and of the camshaft of the motor.

Figure 1:
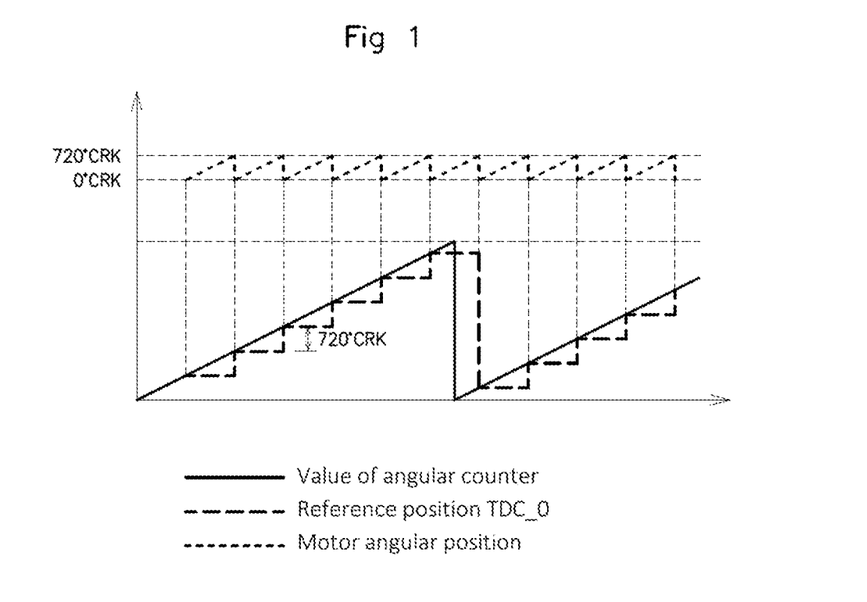
FIG. 1, already described, represents the motor position synchronized with the angular counter, FIG. 2, schematically represents an automotive vehicle electronic computer.

On the basis of this information, this module determines a reference position of the motor corresponding to a zero value of angle of the crankshaft of the motor. With reference to FIG. 1, this reference value associated with the counting by the angular counter makes it possible to associate with each angular position of the angular counter a corresponding angular position of the motor, and therefore to determine an angular position of the motor at each instant as a function of the position of the angular counter. This makes it possible to synchronize motor drive commands with the angular position of the motor.

In certain circumstances it may happen that synchronization between the position of the motor and the position of the angular counter is lost. This is the case for example if data logged by the motor crankshaft or camshaft position sensors are erroneous, or in case of stalling of the motor, etc.

In these cases, the angular position of the motor can no longer be determined on the basis of that of the angular counter. This results in a risk that commands generated by the motor drive software modules (for example ignition of the fuel) are executed at inappropriate moments with respect to the actual position of the motor. This can greatly impair the motor.

It is therefore known, in case of loss of synchronization of the motor, to freeze the angular counter so as to protect the motor, and to stop the execution of the commands by the motor drive software modules before reinitializing the angular counter.

Accordingly, a deactivation command is typically dispatched to these modules by the data production module as soon as a loss of synchronization is detected. Next, once the commands have been deactivated, a new synchronization of the motor is launched by reinitializing the angular counter, that is to say by restarting it at a zero initial angular position.

Conventionally, the microcontrollers used in the guise of electronic computers of automotive vehicles are single-core microcontrollers, that is to say that the microcontroller comprises only a single physical core, or else a single set of electronic circuits, making it possible to execute the various software applications of the microcontroller.

In the case of single-core microcontrollers, a series of commands is executed in a sequential and synchronous manner. Therefore, the implementation by the microcontroller of a function for stopping command of the drive modules before implementing a new synchronization of the motor implies that the commands are necessarily stopped at the moment at which a new synchronization takes place and at which the angular counter is reinitialized.

However, certain microcontrollers of automotive vehicles now have multi-core structures, that is to say that they comprise several physical modules or independent cores, which are adapted to execute programs in parallel in a fully autonomous manner.

This multi-core character removes the sequential character of the implementation of the functions by the microcontroller. In particular, the fact that a command for deactivating the motor drive modules is followed by a command for reinitializing the angular counter does not make it possible to guarantee, when restarting the angular counter, that the drive modules have actually been deactivated.

This results in a risk that commands are launched by the motor drive modules after a reinitialization of the angular counter, and that these commands are completely desynchronized from the angular position of the motor, and cause degradations of the latter.

Moreover, the resynchronization of the motor must take place as quickly as possible after the loss of synchronization and it is not conceivable to wait for a long period of time to ensure that all the motor drive modules are deactivated.

The aim of the invention is to propose a solution to the loss of synchronization of the motor in the case of a multi-core electronic computer.

In particular, an aim of the invention is to make it possible to guarantee the deactivation of the commands of the motor drive modules before reinitializing an angular counter in case of loss of synchronization of the motor.

Another aim of the invention is to allow fast deactivation of the motor drive modules in other circumstances where there are no losses of synchronization of the motor but where the operation of the latter may generate unsuitable triggerings of commands (for example in case of reverse rotation or after a temporary interruption of the motor).

Another aim of the invention is to allow fast deactivation of the motor drive modules when the motor position determined by the production module is not valid.

In this regard, the subject of the invention is a method for processing position data of an automotive vehicle motor, implemented by a multi-core electronic computer comprising:

at least one input, to receive a value of angular position of the crankshaft, from an angular position sensor of the crankshaft, a software module for the production of data of angular position of the motor, adapted to generate a reference angular position on the basis of at least the information provided by said angular position sensor of the crankshaft, and at least one software module for driving the motor as a function of the angular position data, able to receive from the data production software module the value of the reference angular position, said method comprising:

a step of deactivation of each software module for driving the motor by the software module for the production of data of angular position of the motor, followed:

by a step of activation of each software module for driving the motor by the software module for the production of data of angular position of the motor, characterized in that the deactivation step comprises:

a step of dispatching by the software module for the production of data of angular position of the motor, to each software module for driving the motor, of a deactivation command, followed by at least one step of dispatching by the software module for the production of data of angular position of the motor, to each software module for driving the motor, of a request for confirmation that each software module for driving the motor is deactivated, and the step of reactivation of the software modules for driving the motor is implemented only when the deactivation of all the software modules for driving the motor has been confirmed to the software module for the production of data of angular position of the motor.

Advantageously, but optionally, the method according to the invention can furthermore comprise at least one of the following characteristics:

The deactivation step can furthermore comprise at least one repetition of the dispatching of a request for confirmation of the deactivation of the drive modules if at least one drive module has not confirmed its deactivation.

The repetition of the dispatching of the request for confirmation of the deactivation of the drive modules can be implemented within a timespan of between 5 and 20 ms, preferably equal to 10 ms, after the dispatching of the first confirmation request.

The method can furthermore comprise a step of reinitialization of the electronic computer if the production module does not receive any information in respect of confirmation of a deactivated state of each drive module after the repetition or repetitions of the dispatching of the deactivation command, and the step of activation of the drive modules is implemented after the step of reinitialization of the electronic computer.

The electronic computer can comprise an angular counter, and the software module for the production of position data of the motor is adapted to, on the basis of information of angular position of a crankshaft and of a camshaft of the motor, generate a reference angular position of the motor, and in which:

the deactivation step is preceded by a stopping of the angular counter, and the reactivation step is preceded by a step of reinitialization of the angular counter and of computing a new reference angular position of the motor, implemented when the production module has received the information in respect of confirmation of the deactivated state of each drive module.

Each of the software module for data production and of each software module for driving the motor can comprise a low-level software layer and an application-related software layer, and the dispatching of a deactivation command by the production module to each drive module comprises:

the dispatching of a deactivation command by the application-related software layer of the production module to the application-related software layer of each drive module, followed by the dispatching of a deactivation command by the application-related software layer of each drive module to the respective low-level software layer.

Each of the software module for data production and of each software module for driving the motor of the computer comprising a low-level software layer and an application-related software layer, and the low-level software layer of each software drive module being adapted to adopt an "active" state, a "passive" state and a "suspended" state, the reception of a deactivation command by a drive module can bring about the transition of said module from the "active" state or from the "suspended" state to the "passive" state.

The method can furthermore comprise furthermore an additional step of fast deactivation implemented before the deactivation step, comprising the dispatching of a command for fast deactivation of the low-level software layer of the data production module directly to the low-level software layer of each motor drive module.

The reception of a fast deactivation command by a drive module brings about the transition of said module from the "active" state to the "suspended" state.

The method can furthermore comprise an additional step implemented before the deactivation step, in the course of which the low-level software layer of each motor drive module switches from an "active" state to a "suspended" state when a motor position reference value provided by the production module is erroneous.

According to another subject, the invention relates to a multi-core automotive vehicle electronic computer comprising:

a software module for the production of position data of the motor, and at least one software module for driving the motor as a function of the position data, characterized in that it is adapted to implement the method according to the preceding description.

The proposed method makes it possible, through confirmation by the module for the production of the data of angular position of the motor of the fact that the drive modules have indeed been deactivated, to avoid inappropriate triggering of commands of the motor by a multi-core electronic computer, upon a subsequent reactivation of these drive modules.

This is applicable in particular in case of loss of synchronization of the motor, and makes it possible to guarantee stoppage of the commands executed by the motor drive modules before the reinitialization of the angular counter.

This is also applicable during reverse rotation of the motor or during a standby operating phase comprising a temporary interruption of the motor intended to save fuel ("Stop and Start" mode), even if motor synchronization has not been lost.

The possibility of the low-level software layers of the motor drive modules adopting a "suspended" transient state in addition to "active" and "passive" states also allows greater reactivity of the computer to circumstances involving stoppage of the commands, while securing the operation of the computer.

Other characteristics and advantages of the present invention will become apparent on reading the description which follows of a preferential embodiment. This description will be given with reference to the appended drawings in which.

MULTI-CORE ELECTRONIC COMPUTER

Figure 2:
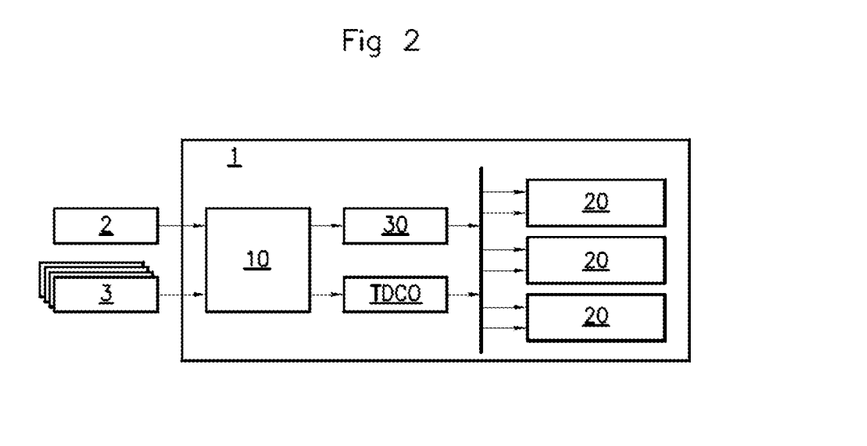

With reference to FIG. 2, an automotive vehicle electronic computer 1 has been schematically represented. The electronic computer 1 is typically a microcontroller, but as a variant could be an integrated circuit of ASIC type, a microprocessor or a processor coupled to a clock, a memory and communication interfaces.

In all cases, the electronic computer 1 is of multi-core type, that is to say that it comprises a processor comprising several physical cores, that is to say several circuits capable of executing programs in an autonomous manner.

The processor of the electronic computer is adapted to execute program instructions corresponding to various functionalities to be executed. In particular, the processor is adapted to execute program instructions corresponding to a software module 10 for the production of data of angular position of the motor of the vehicle, and a plurality of software modules 20 for driving the motor as a function of position data produced by the module 10. The drive modules 20 comprise for example a module for driving the injectors of the motor of the vehicle, a module for driving the ignition of the fuel, etc. The program instructions for the execution of the software modules 10, 20 are installed on a dedicated memory of the electronic computer. Hereinafter, we will speak more simply of the software modules 10, 20 of the electronic computer.

The software module 10 is adapted to receive as input, from a sensor 2 for measuring the angular position of the crankshaft of the motor, a value of crankshaft angular position of between 0 and 720° or 0 and 720 degrees CRK.

Advantageously, the software module 10 is also adapted to receive as input, from a sensor 3 for measuring the angular position of the camshaft of the motor, a value of camshaft angular position of between 0 and 360°.

A motor cycle corresponding to two revolutions of the crankshaft, the cross-referencing of the information of angular position of the crankshaft and of the cam by the data production software module 10 makes it possible to determine the exact angular position of the motor.

To this effect, the position data production software module 10 is also adapted to generate a reference angular position of the motor on the basis of the information provided by the sensors 2 and if relevant 3. Typically, this reference angular position is a zero angular position of the motor, corresponding to the starting of a cycle. This angular position is called TDC0.

Hereinafter, "synchronization" refers to the fact that the data production module 10 generates the value of the reference angular position TDC0 on the basis of the sensors 2 and 3.

Moreover, in order that the motor drive software modules 20 can utilize the angular position of the motor, the electronic computer 1 furthermore comprises an angular counter 30, which is advantageously a free counter (or free running timer) adapted to count a number of ticks between 0 and a maximum value, such that each tick corresponds to a fixed angular resolution.

The angular counter 30 is driven by the data production software module 10. In particular, the data production software module 10 is adapted to start, stop, and reset to zero the angular counter 30.

Each motor drive module 20 receives from the data production software module 10 the value of the reference angular position TDC0, and is furthermore adapted to execute, as a function of this value and of the position of the angular counter, commands of actuators of the motor in a manner synchronized with the latter.

Indeed, as in FIG. 2 presented hereinabove, the matching of the correspondence between the reference position of the motor and the angular counter makes it possible to deduce the absolute angular position of the motor, by subtracting the number of ticks corresponding to the reference position from the number of ticks counted by the angular counter. The position of the angular counter can be utilized in other ways, for example to compute the moment at which a command must be dispatched by a drive module 20, as a function of a corresponding target angular position of the motor.

In this regard, the drive modules 20 are advantageously adapted to communicate with additional modules (not represented) of the electronic computer 1, whose function is to read the angular position of the angular counter 30 and to utilize said position on the basis of the reference angular position of the motor TDC0. The additional modules can thereafter return information to the drive modules 20, allowing the implementation of the commands of actuators in a manner synchronized with the motor. A hardware module for comparing angular value, or software modules of PMT (for the English acronym "Position Minus Timer") or ATD (for the English acronym "Angle Time Driver") type, are for example known as additional module.

Each software module 10, 20 comprises a so-called low-level software layer (also called Basic Software, in English) $BSW_{10,20}$, and an application-related software layer $ASW_{10, 20}$.

The low-level software layer $BSW_{10}$ of the data production module 10 is the software layer by which the module 10 communicates with the sensors 2 and 3 to receive the position data of the crankshaft and of the camshaft, and by which the module 10 dispatches control instructions to the angular counter.

The application-related software layer $ASW_{10}$ of the module 10 is the layer allowing the module to produce the reference position TDC0, on the basis of the information received by the sensors 2 and 3 and transmitted by the low-level layer $BSW_{10}$.

The application-related software layer $ASW_{20}$ of a module 20 is the layer providing angle settings for the control of actuators of the motor to the low-level layer BSW of the module 20.

The low-level software layer $BSW_{20}$ of a module 20 for driving the motor is the software layer receiving the value of the reference position TDC0 and converting, on the basis of the latter, the angle settings into angular counter value settings. It is also the software layer by which the module 20 communicates with an actuator of the motor (for example an injector, a sparkplug) in order to control it.

The structure of these software layers is visible for example in FIGS. 4a, 4b and 8a to 8g.

Each software layer of a module 10, 20 is furthermore adapted to exhibit a finite number of states which will be described in greater detail hereinafter.

In particular, the application-related layer and the low-level layer of each motor drive module 20 is adapted to exhibit a so-called "active" state EP1, and a so-called "passive" state EP2. When the application-related layer $ASW_{20}$ and the low-level layer $BSW_{20}$ of a module exhibit the active state, then the module 20 executes control instructions for the motor 20. When the low-level layer $BSW_{20}$ exhibits the passive state, the commands of the module 20, including the commands of the actuators of the motor, as well as the commands of additional modules aimed at utilizing the position of the angular counter 30, are canceled.

The application-related layer $ASW_{10}$, and the low-level layer $BSW_{10}$, of the data production module 10 is adapted to exhibit:
- a so-called "deactivated" or passive state ED1, typically during starting of the motor or reinitialization of the module, before a synchronization of the motor,
- a so-called "synchonization in progress" state ED2, during which the module 10 is active and searches for the angular position of the motor so as to compute the reference value TDC0 on the basis of the values of the sensors 2 and 3, and
- a so-called "motor position available" state ED3, which corresponds to an active state of the module once the reference angular position of the motor TDC0 has been computed.

Advantageously, but optionally, an additional state ED4 termed "suspended synchronization" is provided for in respect of the software layers of the data production module 10, and a so-called "suspended" additional state EP3 is provided for in respect of the low-level software layers $BSW_{20}$ of the drive modules 20. These states and their manner of operation is described in greater detail hereinafter.

Deactivation of the Drive Modules—Case of Loss of Synchronization

Figure 6:
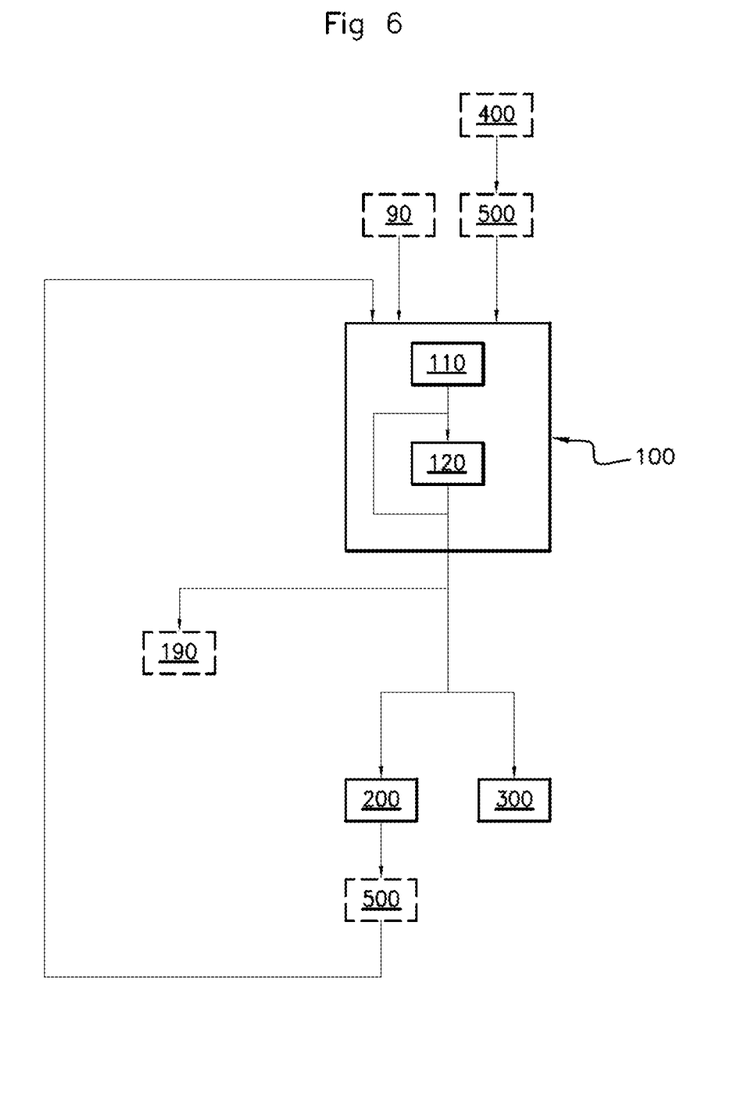

With reference to FIG. 6, a method for processing position data of the motor implemented by the electronic computer 1 described hereinabove will now be described.

This method comprises a first step 100 of deactivation of the software modules 20 for driving the motor by the data production software module 10.

The deactivation 100 comprises the dispatching 110 of a command for deactivation "ExitSyn" of the data production module 10 to each motor drive module 20. The deactivation command makes it possible to cause the state of the low-level layer $BSW_{20}$ of each motor drive module 20 to switch from active to passive, and therefore to cancel all the commands generated by the module 20.

In particular, step 110 of dispatching a command comprises the series of following commands:
- the application-related layer of the module 10 communicates a deactivation instruction to the application-related software layer $ASW_{20}$ of each motor drive module 20, and
- the application-related software layer $ASW_{20}$ of each module 20 switches to the passive state and communicates a deactivation instruction to the corresponding low-level layer $BSW_{20}$ of the module 20.

Step 100 of deactivation of the modules 20 is advantageously, but not limitingly, implemented in case of loss of synchronization between the angular counter 30 and the angular position of the motor. Such a loss of synchronization may arise for example in case of stalling of the motor, of breakdown or of error of measurement of one of the sensors 2 and 3. The loss of synchronization can be detected by the low-level software layer $BSW_{10}$ or by the application-related software layer $ASW_{10}$ of the data production module 10 which then communicates the information to the low-level software layer.

In this case of a loss of synchronization, the method comprises the implementation, before step 100, of a step 90 in the course of which the low-level layer of the module 10 freezes the angular counter 30, and switches the value of the reference angular position TDC0 of the motor to invalid. This makes it possible to protect the motor by preventing the implementation of commands utilizing the position of the angular counter.

In order to resume normal operation subsequent to the loss of synchronization, it is necessary to restart the angular counter 30 and therefore to reinitialize it to a zero initial value.

Before reinitializing the angular counter 30, it is imperative to deactivate the drive software modules 20 so as to stop the dispatching of command to the actuators of the motor. Indeed, the triggering of the commands during the restarting of the angular counter 30 would be desynchronized with the motor and could cause operating defects or degradations of the motor.

However, in the case of a multi-core electronic computer 1, the dispatching of an instruction for deactivation of the low-level software layer $BSW_{20}$ of each module 20, before the implementation of a step 200 of reactivation of each module 20, does not guarantee that the modules are actually deactivated and in particular that the respective commands generated by the modules are canceled.

Consequently, the deactivation step 100 furthermore comprises a step 120 of dispatching to each drive module 20, by the data production module 10, a request for confirmation that the corresponding module 20 is indeed deactivated, that is to say that all its commands have been canceled.

This request is a synchronous request so that the module 10 immediately receives a response from each drive module.

Advantageously, step 120 is implemented on completion of a determined timespan, of between 5 and 20 ms, for example equal to 10 ms, after the dispatching 110 of the deactivation command.

When all the drive modules 20 have confirmed their deactivation, the method thereafter comprises a step 200 of reactivation of each drive module 20, which comprises the dispatching, by the data production module 10, of a command for reactivating each drive module 20 so that the application-related layer $ASW_{20}$, and then the low-level layer $BSW_{20}$ of each drive module 20 adopts the active state.

In the case where step 100 has been implemented because of a loss of synchronization, the method furthermore comprises a step 190 prior to step 200 in the course of which the low-level layer $BSW_{10}$ of the module 10 reinitializes the angular counter 30, that is to say restarts it from the initial value 0, recomputes the value of the reference angular position of the motor TDC0 and returns it to the drive modules 20.

On the other hand, if in response to the confirmation request 120, at least one drive module 20 has indicated to the data production module 10 that not all its commands were canceled, the method advantageously comprises the repetition, a determined number of times greater than or equal to one, of step 120. This repetition is implemented on completion of a determined timespan elapsed from the previous implementation of step 120, the timespan being for example between 5 and 20 ms, advantageously equal to 10 ms.

In the case where, on completion of the repeated implementation of step 120, not all the drive modules 20 have confirmed their deactivation, the method comprises a step 300 of reinitialization of the electronic computer 1. During this reinitialization, all the software layers of all the modules are forced to switch to the "passive" or "deactivated" state and the angular counter is also reinitialized.

Figure 3A:
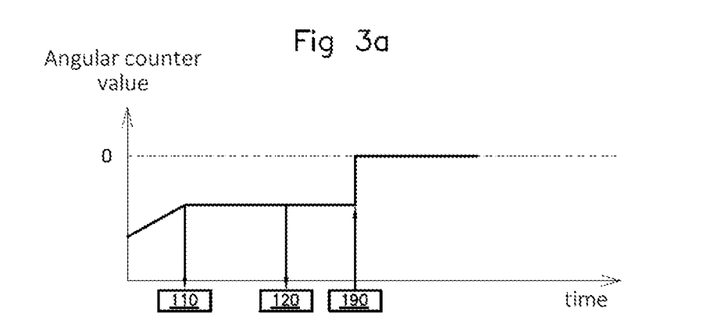
FIGS. 3a to 3c represent various implementations of a step of deactivation of the drive modules in case of a loss of synchronization of the motor.
Figure 3B:
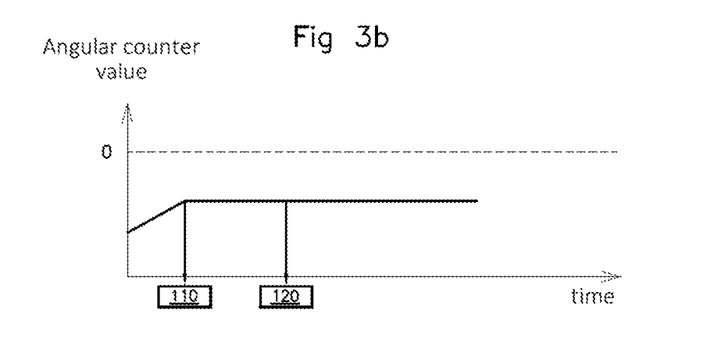
Figure 3C:
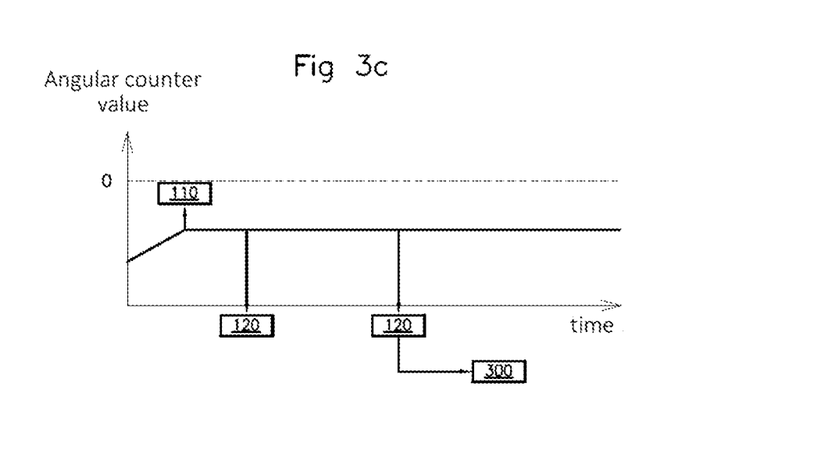

In FIGS. 3a to 3c, the time has been represented as abscissa and the value of the angular counter 30 as ordinate.

With reference to FIG. 3a, an exemplary implementation of the method has thus been represented in which, at the moment of a loss of synchronization, the angular counter 30 being frozen, the deactivation command is dispatched in step 110.

On completion of a timeout of 10 ms, a request 120 for confirmation of deactivation is dispatched by the data production module 10 to each drive module 20, and each module 20 confirms its deactivation.

The method then comprises a reinitialization 190 of the angular counter 30 and a reactivation of each drive module 20.

In the case of FIG. 3b, the case has been represented where one of the drive modules 20 is not deactivated during the dispatching of the request 120 for confirmation of deactivation by the module 10. In this case therefore, the reactivation step 200 does not take place.

In FIG. 3c, the repetition of step 120 has been represented. When after the repetition of step 120, at least one of the modules is still not deactivated, and this step is followed by the reinitialization 300 of the electronic computer 1.

Fast Deactivation of the Drive Modules

In certain circumstances, it may be necessary to interrupt the commands dispatched by the motor drive modules 20, even when synchronization of the motor has not been lost.

This is for example the case during reverse rotation of the motor. Such reverse rotation may arise during an abrupt decrease of the motor revs at low revs, or for example during a momentary stoppage of the motor to save vehicle fuel consumption (case termed "Stop and Start"), during which the motor may oscillate in rotation before stopping.

In these cases, the angular position of the motor continues to be followed, the angular counter 30 is not interrupted and the reference angular position TDC0 is valid. Nonetheless, in this type of circumstance one does not wish to command the motor (for example one does not wish to trigger injection or ignition of the fuel), and it is necessary to cancel the commands of the motor drive modules 20. Moreover, the commands must then be canceled as rapidly as possible to avoid untimely command of the motor upon the resumption of normal rotation of the motor and during reverse rotation.

In this case, the method then comprises a step 400 of fast deactivation of the drive modules 20. With reference to FIG. 4b, this step 400 comprises the dispatching, directly from the low-level layer $BSW_{10}$ of the data production module 10 to the low-level layer $BSW_{20}$ of each drive module 20, of a deactivation command.

Figure 4A:
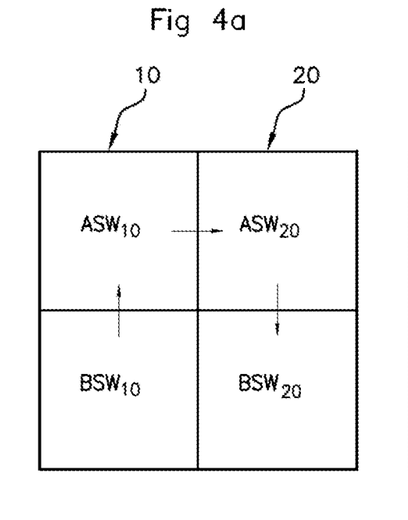
FIGS. 4a and 4b represent two embodiments of a step of dispatching a command for deactivating the motor drive modules.
Figure 4B:
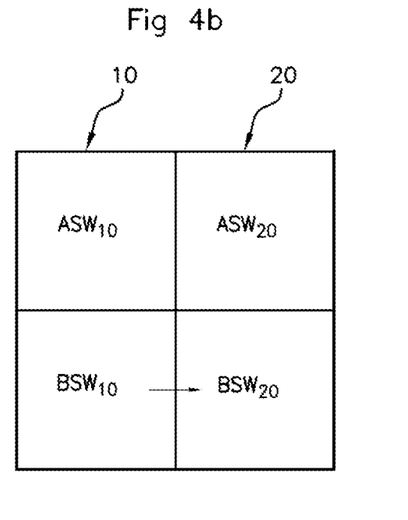

Indeed, this command is faster than that of step 110 represented in FIG. 4a and which necessitates traveling through the application-related layers of the various modules.

According to one embodiment, the reception of the deactivation command by a low-level layer $BSW_{20}$ of a drive module, when said command is dispatched by the low-level layer of the module 10, brings about the switching to the deactivated state of said layer.

As a variant, the low-level layer $BSW_{20}$ of a drive module may switch to the suspended state, as described in greater detail hereinafter.

In all cases, the step 400 of fast deactivation of the modules 20 brings about a difference of state between the application-related layer, which has remained in the active state, and the low-level layer of a module 20. This decorrelation of the states of the software layers must not last in order to avoid malfunctions of the computer.

Consequently, step 400 is then followed by the implementation of previously described steps 100 of deactivation and 200 of reactivation or 300 of reinitialization, so as to deactivate the application-related layer, and then the low-level layer of each motor drive module 20, before reactivating them. This makes it possible to re-establish a correlation between the application-related layers of the modules 20 and the corresponding low-level layers.

Suspended State

As mentioned hereinabove, according to a particular embodiment, the low-level software layer of the motor drive modules 20 can adopt, in addition to the active state EP1 and the passive state EP2, a so-called "suspended" state EP3.

This state is a transient state comprising, like the passive state, a deactivation of all the commands of actuators and of all the commands of modules for the utilization of the angular counter. However, in contradistinction to the passive state, this state is designed to log the inconsistency with the state of the application-related layer of the same module, and its adoption does not generate any risk of malfunction of the computer.

Figure 5:
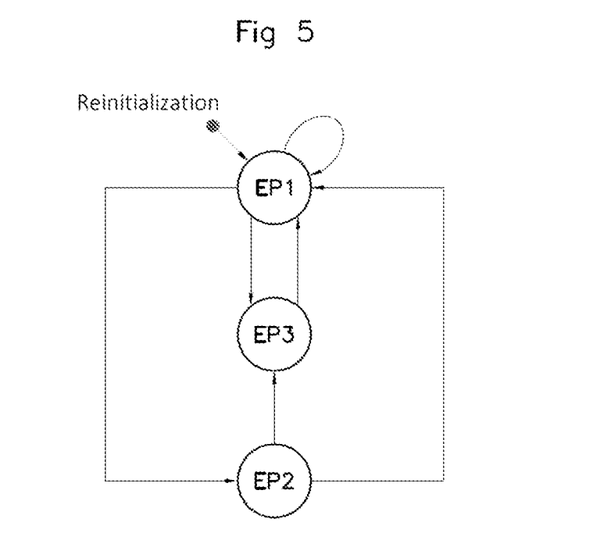
FIG. 5 represents a state machine of the low-level layer of the motor drive modules, FIG. 6 schematically represents the main steps of a method for processing data.

With reference to FIG. 5, the suspended state may be adopted either from the passive state, or from the active state. On the other hand, from the suspended state, only the passive state can be adopted.

More precisely, the manner of operation of the state machine corresponding to the low-level software layer of a module 20 for driving the motor is as follows:

switching from an active or suspended state to an inactive state on receipt of a deactivation command 110 originating from the application-related layer of the data production module 10, switching from an inactive state to the active state on receipt of an activation command 200 originating from the application-related layer of the data production module 10, in one embodiment, switching from an active to suspended state on receipt of a fast deactivation command 400 originating from the low-level layer of the data production module 10, switching from an inactive to suspended state on receipt of an activation command originating from the application-related layer of the data production module 10 with an invalid value of reference angular position of the motor.

In a more detailed manner, the suspended state can be adopted in the following various cases.

Firstly, in the case of fast deactivation 400 of the drive modules 20, during which the low-level layer of a module 20 receives a deactivation request emitted by the low-level layer $BSW_{10}$, of the data production module 10. This request can cause the low-level layer $BSW_{20}$ of a drive module 20 to switch to the suspended state rather than to the passive state. A step of switching to the suspended state of the layer $BSW_{20}$ of a module 20 is denoted 500.

As a variant, the suspended state can be adopted 500 in the case where, in the course of a step 200 of activation of the motor drive modules 20, synchronization of the motor is lost immediately. In this case, the application-related layers of the modules 20 have already been activated but not the low-level layers. The reference value TDC0 which is dispatched by the module 10 to each module 20 is then invalid. When the low-level layers BSW20 of the modules 20 receive the reference value TDC0 and note that this datum is invalid, these layers switch to the suspended state. This switching to the suspended state 500 in case of fast deactivation or of fast synchronization loss makes it possible to deactivate all the commands of the module 20 but without placing the low-level layer of the module 20 in a passive state whilst the application-related layer is still in an active state. The manner of operation of the module is therefore more robust with this state.

In this case, subsequent to the switch to the suspended state, the deactivation step 100 is implemented, and the low-level layer of the module 20 switches from the suspended state to the passive state on receipt of the deactivation command originating from the application-related layer of the data production module 10, via the application-related layer of the module 20. Step 100 is followed as described previously by a reactivation step 200 or by a reinitialization step 300.

According to another embodiment, the suspended state may be used in the case of a suspension of synchronization. In this embodiment, the state machines corresponding to the software layers $ASW_{10}$, and $BSW_{10}$, of the data production module 10 exhibit the additional state "motor synchronization suspended".

This type of case may in particular occur when the vehicle does not comprise any camshaft position sensor or when the position of the camshaft is not available. In this case it is not possible to determine the angular position of the motor and the state of the motor cycle solely according to the position of the crankshaft, since a motor cycle covers two revolutions of the crankshaft.

Then, a first reference angular position TDC0 of the motor can be determined by the data production module 10 by making an assumption about the fact that the cycle of the motor corresponds to the first or to the second revolution of the crankshaft, this angular position being communicated normally to the motor drive modules 20. The software layers of the data production module 10 are then in the "motor position available" state.

The data production module 10 thereafter monitors the operation of the motor as a function of this reference angular position value TDC0. The detection of a malfunction of the motor makes it possible if relevant to note that the assumption adopted for the computation of the reference value TDC0 was invalid.

In this case, the software layers of the module 10 switch to the "motor synchronization suspended" state, thereby bringing about directly the dispatching of a command for fast deactivation 400 of the low-level layer of the module 10 to the low-level layer of each drive module 20 so that the latter switches from the active state to the suspended state.

The fast deactivation command 400 is in this case also followed by a step 100 of deactivation and by a step 200 of reactivation or 300 of reinitialization in accordance with the preceding description, so as to harmonize the states of the various software layers of the modules and to guarantee stoppage of the commands before the resumption of normal operation.

Figure 7:
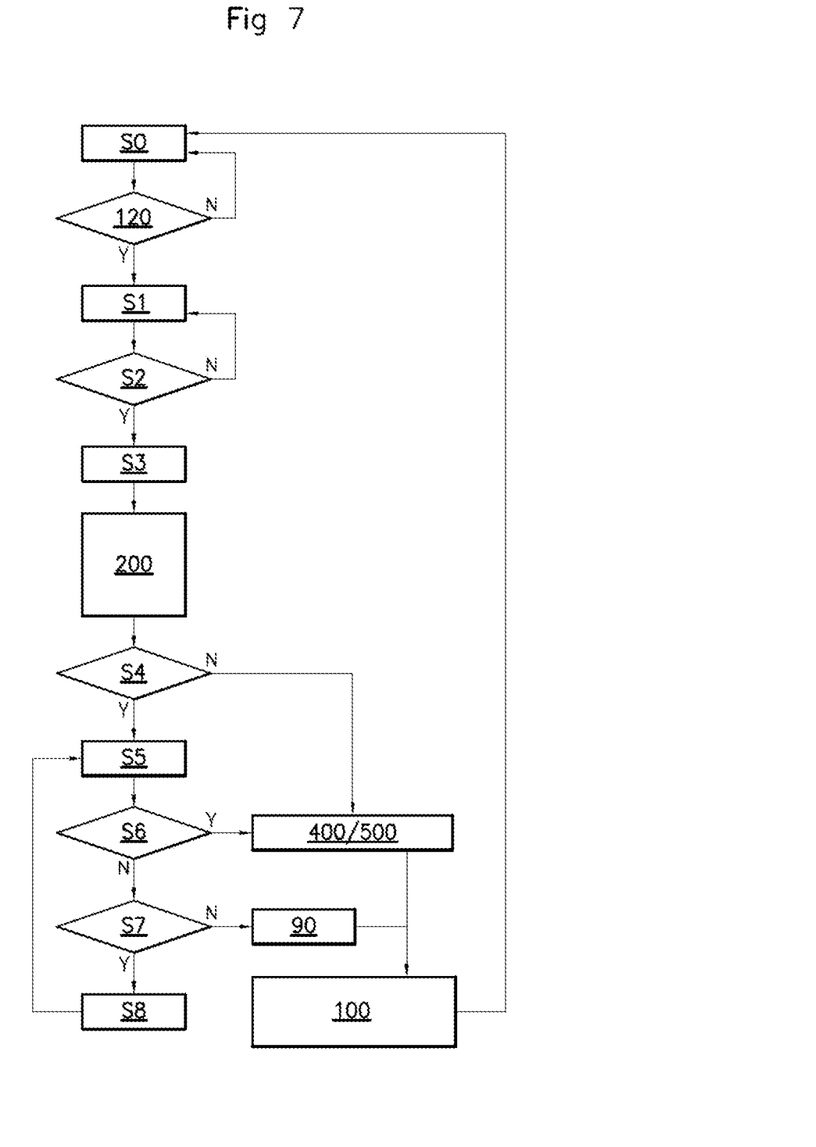
FIG. 7 is a logic diagram schematically representing a detailed example of a method for processing data according to one embodiment of the invention.

With reference to FIG. 7, an exemplary implementation of the processing method integrating the various situations set forth hereinabove will now be described.

During an initial situation S0, synchronization of the motor is not carried out, and the data production and motor drive modules 10, 20 are inactive. This situation corresponds to the states of FIG. 8a.

On returning to FIG. 7, before the search for motor synchronization S0, the method comprises a step 120 of verifying that all the drive modules 20 are inactive. If no (N), the initial situation S0 is returned to, if yes (Y), the method continues with the establishment of motor synchronization S1.

A step S2 asks whether motor synchronization has been achieved. If no (N), step S1 synchronization is implemented as long as synchronization is not achieved. If yes (Y), the method continues in step S3 in which synchronization is performed.

The method then comprises a step 200 of activation of the motor drive modules 20, comprising firstly the activation of the application-related software layer 20 of said modules, and then the activation of the low-level software layer of the modules. The state obtained on completion of step 200 is the state represented in FIG. 8c.

The method thereafter comprises a step S4 in the course of which it is determined whether the reference position of the motor TDC0 is valid. If no (N), then the method comprises a step 500 of switching to the suspended state of the low-level layers of the motor drive modules. This step is followed by a step 100 of deactivation of the motor drive modules 20.

If the reference position TDC0 is valid (Y), the method continues with a step S5 where the position of the motor is computed on the basis of the reference position TDC0.

The method thereafter comprises a step S6 in the course of which it is determined whether the vehicle is in a reverse rotation situation. If yes (Y), the method comprises a step 400 of fast deactivation of the low-level layers of the motor drive modules 20. This step can bring about the switching 500 to the suspended state of the low-level layers of the motor drive modules, and is followed by a step 100 of deactivation of the control modules 20.

If no (N), the method comprises a step S7 in the course of which it is verified again whether the motor position determined by the module 10 is still valid. If yes (Y), the commands of the motor drive modules 20 can be executed during a step S8, which loops back to step S5.

If no (N), one is dealing with a case of loss of synchronization of the motor. The method then comprises a step 90 of stoppage of the angular counter, followed by a step 100 of deactivation of the control modules, comprising the inactivation of the application-related layers $ASW_{20}$ of the modules 20, and then of the low-level layers $BSW_{20}$ of said modules.

On completion of step 100, the method loops back to step S0.

The manner of operation of the various state machines of the modules 10, 20 during the implementation of the data processing method will be presented with reference to FIGS. 8a to 8g.

Figure 8A:
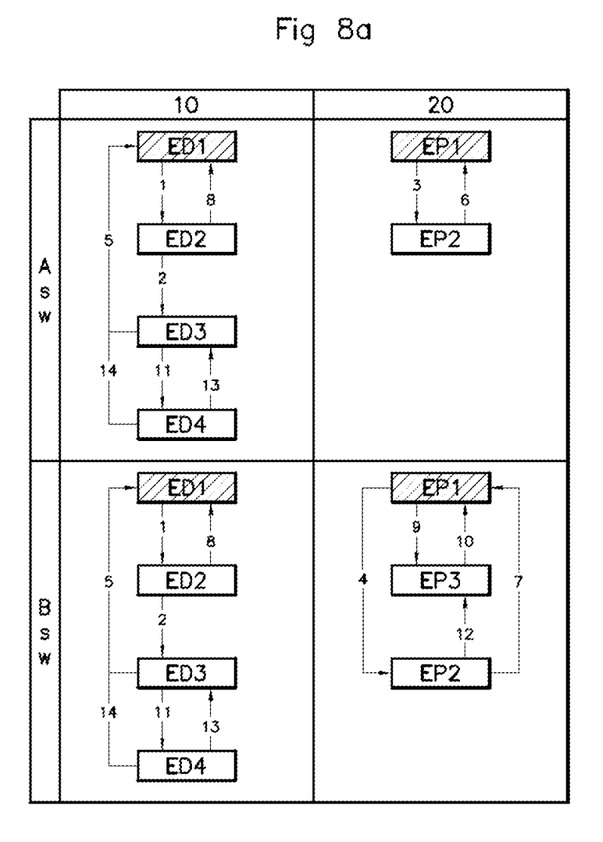
FIGS. 8a to 8g represent the states adopted by the software modules of the electronic computer during the implementation of the various steps of the processing method.

In FIG. 8a, the software layers of the module 10 are in the deactivated state ED1, and the software layers of each module 20 are in the inactive state EP1. This is dealing with a case where all the modules are deactivated, for example on startup of the motor where subsequent to the implementation of a deactivation step 100 for example in case of loss of synchronization with a step 90 of stoppage of the angular counter.

Figure 8B:
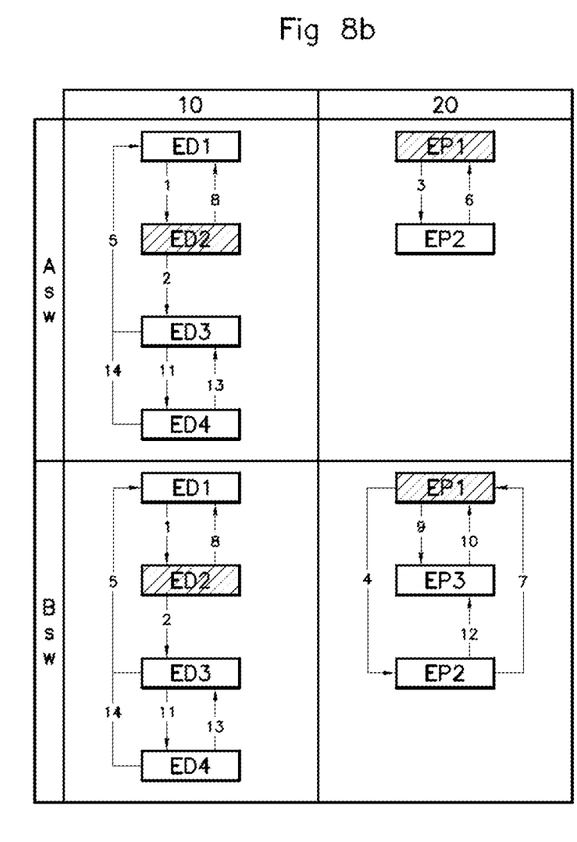

In FIG. 8b, implementation of motor synchronization is in progress. The transition 1 brings the software layers of the module 10 to the "motor synchronization in progress" state ED2, while the software layers of the modules 20 are still in the inactive state EP1.

Figure 8C:
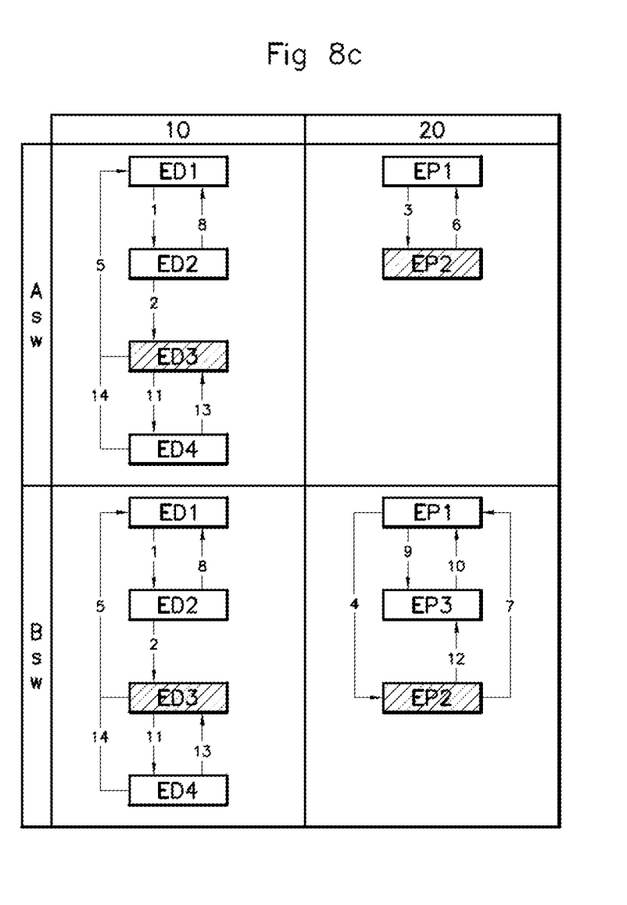

In FIG. 8c, motor synchronization is obtained by the module 10. The transition 2 brings the software layers of the module 10 to the state ED3 of position of the motor available. Therefore the application-related layer of each module 20 is activated, so that on completion of the transition 3 it adopts the active state EP2. The activation of this application-related layer brings about the activation of the corresponding low-level layer, corresponding to the transition 4 which brings said layer to the active state EP2.

Figure 8D:
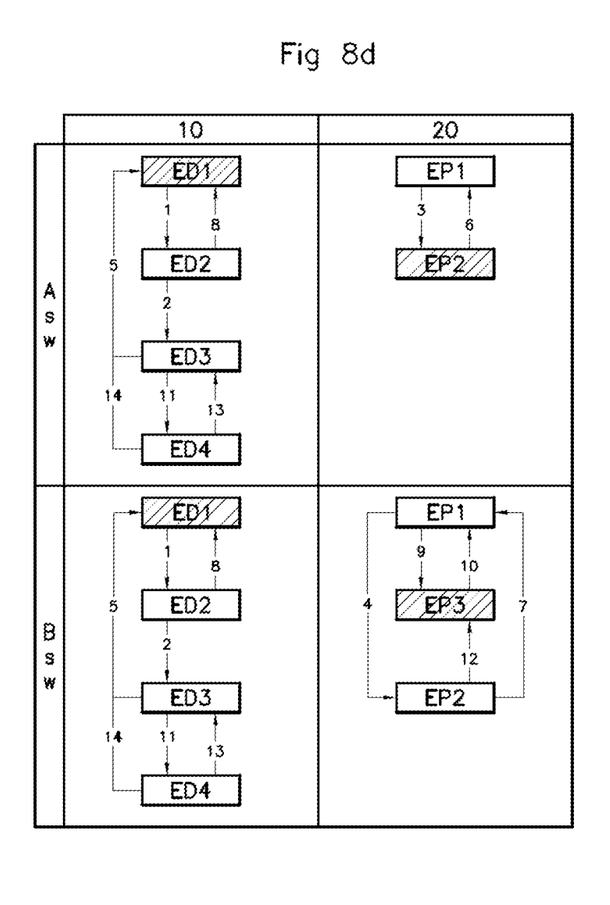

The case of an immediate loss of synchronization during the activation of the drive modules 20 has been represented in FIG. 8d. In this case the transition 5 brings the software layers of the module 10 from the synchronized state ED3 to the deactivated state ED1. The state of the application-related layer $ASW_{20}$ of the modules 20 is then still active. On the other hand the reception by the low-level layer $BSW_{20}$ of an invalid reference value TDC0 brings about the transition 9 of switching to the suspended state EP3 of the corresponding layer.

Figure 8E:
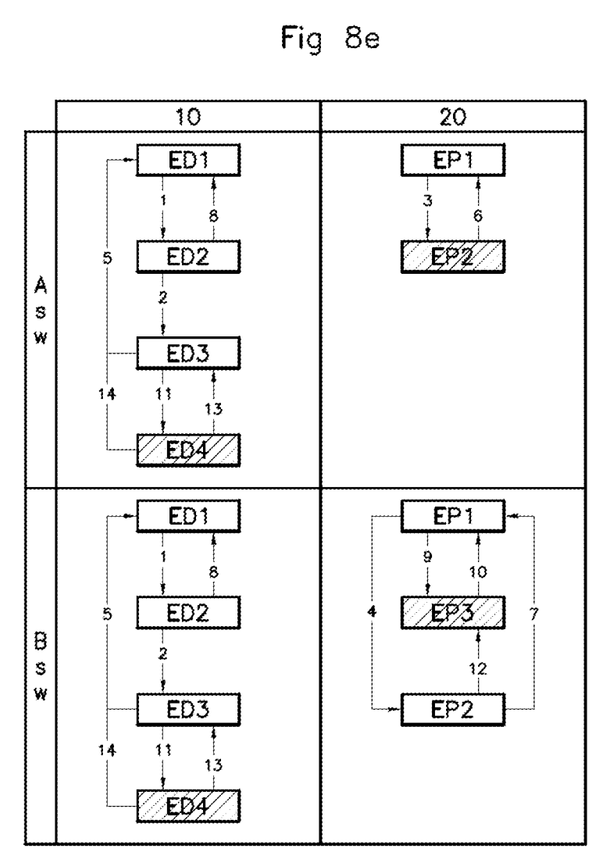

The case of a suspension of synchronization, where the software layers switch (transition 14) to the state ED4 of suspension of synchronization, thereby bringing about the dispatching of a fast deactivation command 400 to the low-level layer $BSW_{20}$ of the module 20, which switches to the suspended state EP3 through the transition 12, has been represented in FIG. 8e.

Figure 8F:
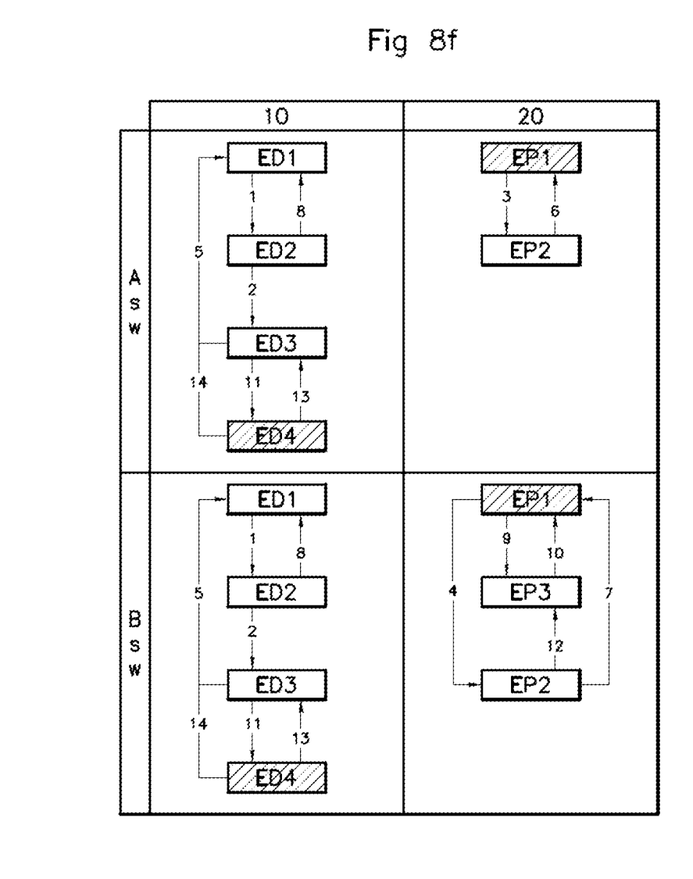

In FIG. 8f, when synchronization has been suspended, fast deactivation is followed by a step 100 of deactivation of the modules 20, thereby bringing the application-related layer of each module to the inactive state EP1 through the transition 6, and the low-level layer to the inactive state EP1 through the transition 10.

Figure 8G:
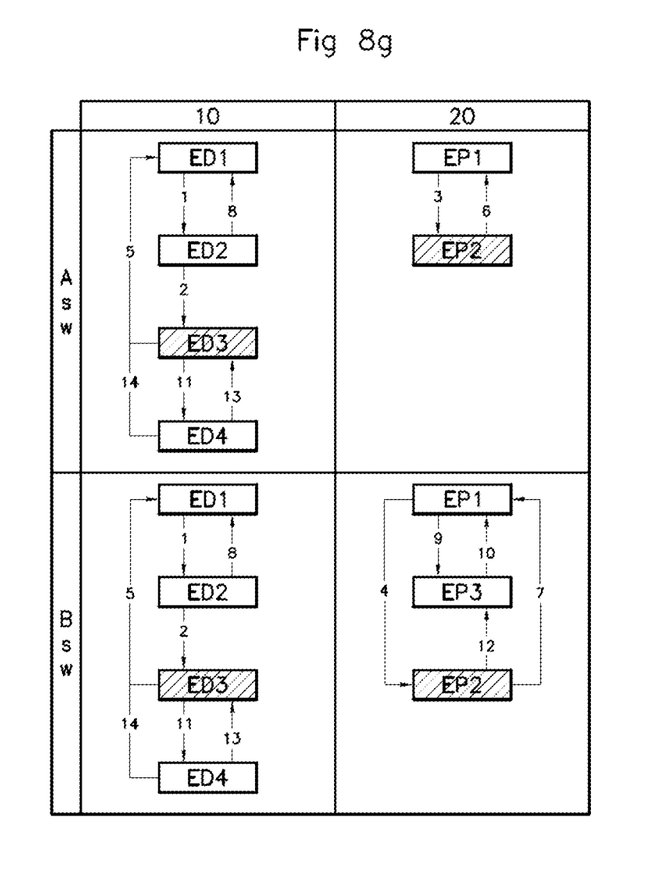

Finally, FIG. 8g describes the example of a resumption of synchronization in which the software layers of the module 10 switch back to the synchronized state ED3 through the transition 13. The application-related and low-level software layers of the modules 20 switch back to the active state EP2 through the transitions 3 and 4 respectively.

The invention claimed is:

1. A method for processing position data of an automotive vehicle motor, implemented by a multi-core electronic computer (1) comprising:
   at least one input, to receive a value of angular position of the crankshaft, from an angular position sensor of the crankshaft,
   a software module (10) for the production of data of angular position of the motor, adapted to generate a reference angular position (TDC0) on the basis of at least the information provided by said angular position sensor of the crankshaft, and
   at least one software module (20) for driving the motor as a function of the angular position data, able to receive from the software module (10) for data production the value of the reference angular position (TDC0),
said method comprising:
   a step (100) of deactivation of each software module for driving the motor by the software module (10) for the production of data of angular position of the motor, followed:
   by a step (200) of activation of each software module for driving the motor by the software module (10) for the production of data of angular position of the motor,
wherein the deactivation step (100) comprises:
   a step (110) of dispatching by the software module for the production of data of angular position of the motor, to each software module for driving the motor, of a deactivation command,
   followed by at least one step (120) of dispatching by the software module (10) for the production of data of angular position of the motor, to each software module (20) for driving the motor, of a request for confirmation that each software module (20) for driving the motor is deactivated, and
   the step (200) of reactivation of the software modules for driving the motor is implemented only when the deactivation of all the software modules (20) for driving the motor has been confirmed to the software module (10) for the production of data of angular position of the motor.

2. The method for processing data as claimed in claim 1, in which the deactivation step (100) furthermore comprises at least one repetition of the dispatching (120) of a request for confirmation of the deactivation of the drive modules if at least one drive module has not confirmed its deactivation.

3. The method for processing data as claimed in claim 2, in which the repetition of the dispatching (120) of the request for confirmation of the deactivation of the drive modules is implemented within a timespan of between 5 and 20 ms, preferably equal to 10 ms, after the dispatching of the first confirmation request.

4. The method for processing data as claimed in claim 3, furthermore comprising a step of reinitialization of the electronic computer if the production module does not receive any information in respect of confirmation of a deactivated state of each drive module after the repetition or repetitions of the dispatching of the deactivation command, and the step of activation of the drive modules is implemented after the step of reinitialization of the electronic computer.

5. The method for processing data as claimed in claim 3, in which the electronic computer comprises an angular counter, and the software module for the production of position data of the motor is adapted to, on the basis of information of angular position of a crankshaft and of a camshaft of the motor, generate a reference angular position of the motor, and in which:
   the deactivation step is preceded by a stopping of the angular counter, and
   the reactivation step is preceded by a step of reinitialization of the angular counter and of computing a new reference angular position of the motor, implemented when the module for the production of data of angular position of the motor has received the information in respect of confirmation of the deactivated state of each software module for driving the motor.

6. The method for processing data as claimed in claim 3, in which each of the software module for the production of data of angular position of the motor and of each software module for driving the motor comprises a low-level software layer and an application-related software layer, and the dispatching of a deactivation command by the module for the production of data of angular position of the motor to each software module for driving the motor comprises:

the dispatching of a deactivation command by the application-related software layer of the module for the production of data of angular position of the motor to the application-related software layer of each software module for driving the motor, followed by the dispatching of a deactivation command by the application-related software layer of each software module for driving the motor to the respective low-level software layer.

7. The method for processing data as claimed in claim 2, furthermore comprising a step (300) of reinitialization of the electronic computer (1) if the production module does not receive any information in respect of confirmation of a deactivated state of each drive module after the repetition or repetitions of the dispatching of the deactivation command, and the step of activation of the drive modules is implemented after the step of reinitialization of the electronic computer.

8. The method for processing data as claimed in claim 7, in which the electronic computer comprises an angular counter, and the software module for the production of position data of the motor is adapted to, on the basis of information of angular position of a crankshaft and of a camshaft of the motor, generate a reference angular position of the motor, and in which:

the deactivation step is preceded by a stopping of the angular counter, and the reactivation step is preceded by a step of reinitialization of the angular counter and of computing a new reference angular position of the motor, implemented when the module for the production of data of angular position of the motor has received the information in respect of confirmation of the deactivated state of each software module for driving the motor.

9. The method for processing data as claimed in claim 7, in which each of the software module for the production of data of angular position of the motor and of each software module for driving the motor comprises a low-level software layer and an application-related software layer, and the dispatching of a deactivation command by the module for the production of data of angular position of the motor to each software module for driving the motor comprises:

the dispatching of a deactivation command by the application-related software layer of the module for the production of data of angular position of the motor to the application-related software layer of each software module for driving the motor, followed by the dispatching of a deactivation command by the application-related software layer of each software module for driving the motor to the respective low-level software layer.

10. The method for processing data as claimed in claim 2, in which the electronic computer comprises an angular counter, and the software module for the production of position data of the motor is adapted to, on the basis of information of angular position of a crankshaft and of a camshaft of the motor, generate a reference angular position of the motor, and in which:

the deactivation step is preceded by a stopping of the angular counter, and the reactivation step is preceded by a step of reinitialization of the angular counter and of computing a new reference angular position of the motor, implemented when the module for the production of data of angular position of the motor has received the information in respect of confirmation of the deactivated state of each software module for driving the motor.

11. The method for processing data as claimed in claim 2, in which each of the software module for the production of data of angular position of the motor and of each software module for driving the motor comprises a low-level software layer and an application-related software layer, and the dispatching of a deactivation command by the module for the production of data of angular position of the motor to each software module for driving the motor comprises:

the dispatching of a deactivation command by the application-related software layer of the module for the production of data of angular position of the motor to the application-related software layer of each software module for driving the motor, followed by the dispatching of a deactivation command by the application-related software layer of each software module for driving the motor to the respective low-level software layer.

12. The method for processing data as claimed in claim 1, in which the electronic computer (1) comprises an angular counter (30), and the software module (10) for the production of position data of the motor is adapted to, on the basis of information of angular position of a crankshaft and of a camshaft of the motor, generate a reference angular position of the motor, and in which:

the deactivation step (100) is preceded by a stopping of the angular counter (90), and the reactivation step (200) is preceded by a step (190) of reinitialization of the angular counter and of computing a new reference angular position of the motor, implemented when the module for the production of data of angular position of the motor has received the information in respect of confirmation of the deactivated state of each software module for driving the motor.

13. The method for processing data as claimed in claim 12, in which each of the software module for the production of data of angular position of the motor and of each software module for driving the motor comprises a low-level software layer and an application-related software layer, and the dispatching of a deactivation command by the module for the production of data of angular position of the motor to each software module for driving the motor comprises:

the dispatching of a deactivation command by the application-related software layer of the module for the production of data of angular position of the motor to the application-related software layer of each software module for driving the motor, followed by the dispatching of a deactivation command by the application-related software layer of each software module for driving the motor to the respective low-level software layer.

14. The method for processing data as claimed in claim 1, in which each of the software module (10) for the production of data of angular position of the motor and of each software module for driving the motor (20) comprises a low-level software layer ($BSW_{10}$, $BSW_{20}$) and an application-related software layer ($ASW_{10}$, $ASW_{20}$), and the dispatching of a deactivation command (110) by the module for the production of data of angular position of the motor to each software module for driving the motor comprises:

the dispatching of a deactivation command by the application-related software layer of the module for the production of data of angular position of the motor to the application-related software layer of each software module for driving the motor, followed by the dispatching of a deactivation command by the application-related software layer of each software module for driving the motor to the respective low-level software layer.

15. The processing method as claimed in claim 1, each of the software module for the production of data (10) of angular position of the motor and of each software module for driving the motor (20) of the computer (1) comprising a low-level software layer ($BSW_{10}$, $BSW_{20}$) and an application-related software layer ($ASW_{10}$, $ASW_{20}$), and the low-level software layer of each software module for driving the motor being adapted to adopt an "active" state, a "passive" state and a "suspended" state, in which the reception of a deactivation command (110) by a module for driving the motor (20) brings about the transition of said module from the "active" state or from the "suspended" state to the "passive" state.

16. The method for processing data as claimed in claim 15, furthermore comprising an additional step of fast deactivation (400) implemented before the deactivation step (100), comprising the dispatching of a command for fast deactivation of the low-level software layer ($BSW_{10}$) of the module (10) for the production of data of angular position of the motor directly to the low-level software layer ($BSW_{20}$) of each module (20) for driving the motor.

17. The method for processing data as claimed in claim 16, in which the reception of a fast deactivation command (400) by a software module for driving the motor brings about the transition of said module from the "active" state to the "suspended" state.

18. The method for processing data as claimed in claim 15, furthermore comprising an additional step implemented before the deactivation step, in the course of which the low-level software layer of each software module for driving the motor switches from an "active" state to a "suspended" state when a motor position reference value provided by the module for the production of data of angular position of the motor is erroneous.

19. A multi-core electronic computer (1) of automotive vehicle comprising:
 a software module (10) for the production of position data of the motor, and
 at least one software module (20) for driving the motor as a function of the position data,
wherein the electronic computer is adapted to implement the method according to claim 1.

20. A non-transitory computer-readable medium on which is stored computer code, including a software module for the production of position data of the motor, and at least one software module for driving the motor as a function of the position data, such that when the computer code is executed by a multi-core electronic computer, the computer code performs the method of claim 1.

* * * * *